Figure 1:
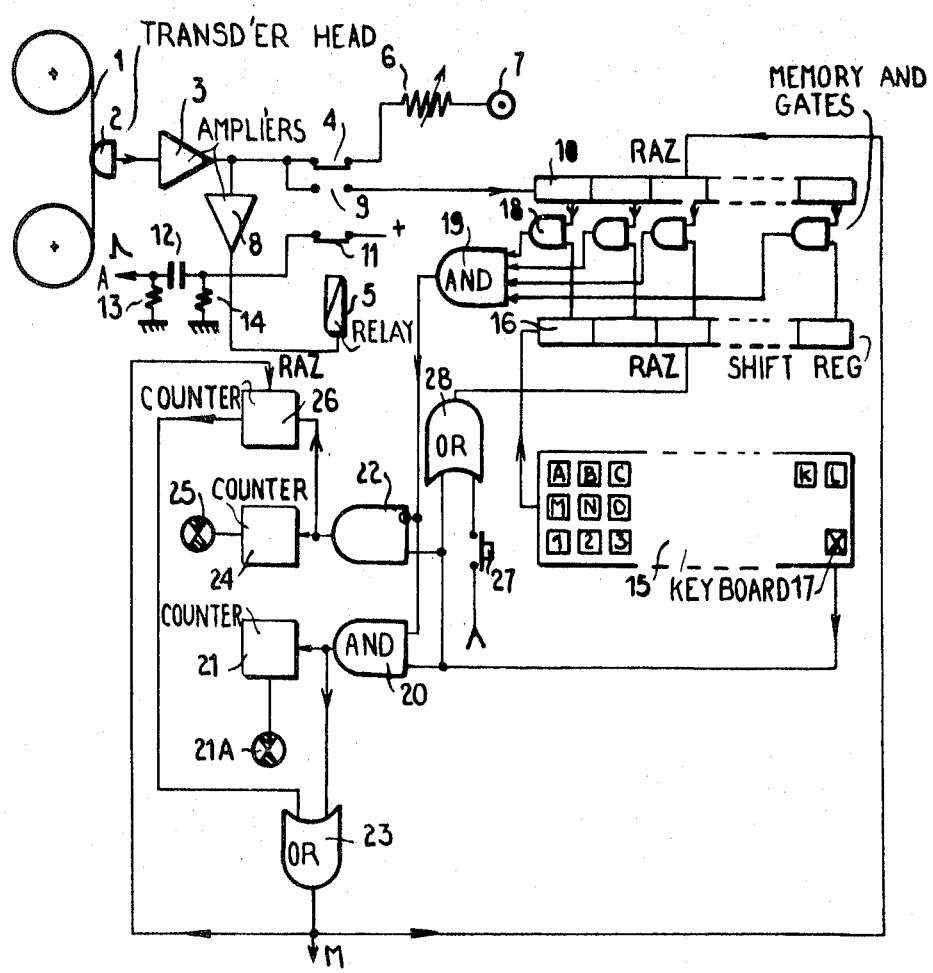

United States Patent

Laplume

[15] 3,660,912
[45] May 9, 1972

[54] TEACHING MACHINE

[72] Inventor: Jacques Laplume, Gif-sur-Yvette, France

[73] Assignee: Societe D'Etudes Techniques et D'Entreprises Generales SODETEG, LePlessis-Robinson, France

[22] Filed: Nov. 26, 1969

[21] Appl. No.: 880,144

[30] Foreign Application Priority Data

Nov. 26, 1968 France....................175325

[52] U.S. Cl. ...................................................35/9 A
[51] Int. Cl. ..........................................G09b 7/04
[58] Field of Search ........................35/9, 9 B, 9 A

[56] References Cited

UNITED STATES PATENTS

| | | | |
|---|---|---|---|
| 3,210,864 | 10/1965 | Tillotson | 35/9 |
| 3,383,781 | 5/1968 | Diuzet | 35/9 |
| 3,504,447 | 4/1970 | Brudner | 35/9 |
| 3,553,852 | 1/1971 | Dorsett | 35/9 R |

Primary Examiner—Wm. H. Grieb
Attorney—Flynn & Frishauf

[57] ABSTRACT

A movable record, such as a magnetic tape stores instructional items in paragraph form; associated with each instructional item is a code, recorded on the tape, indicative of a correct answer. A student-operated keyboard is provided which, upon depression of a key indicative of the correct answer, as instructed by the instructional item recorded on the tape, will provide a signal which is compared with a signal derived from the code recorded on the tape and, upon coincidence, causes the tape to proceed to the next instructional item. Upon non-coincidence, an "error response" is indicated; the next, or a subsidiary instructional item will be displayed to the student when a predetermined number of incorrect answers has been counted. The ends of items and switch-over of mode of the receiver (from sound for the student to decoding) is controlled by a special frequency recorded on the tape.

12 Claims, 8 Drawing Figures

TEACHING MACHINE

RELATED APPLICATION

U.S. Ser. No. 832,290, filed June 11, 1969, by Jacques Laplume.

The present invention relates to teaching machines, and more particularly to such machines in which instructional items are presented to a student in subdivided, or paragraph form, each item terminating in a question to which the student is to reply, to test the comprehension of the material being taught in the instructional item. The further presentation of instructional material is stopped after the question, to permit the student time to answer, the student being supplied with a keyboard or other manually operable device, such as a telephone dial, which enables the student to choose a number of different letters, numbers, or alphanumeric combinations in accordance with the reply he wishes to give in the light of the question posed.

Teaching machines in which instructional items are separately presented to individual students have the advantage over computer-type generated teaching programs that they are comparatively inexpensive, do not require specialized programming, while quickly and efficiently providing instructional material to the students. Additionally, it is simple to check whether the student has learned the material presented by concluding even small steps in the teaching process with frequent questions. Some of these machines may be arranged such that each instructional item ends by a multiple choice question, the particular choices being selected by pressing a key or dialing a number. When the student has given the correct answer or, if desired, after a predetermined number of erroneous answers has been recorded, the machine may give a complete correct answer in clear language, then to resume further instructional item in accordance with a recorded text. The correct and incorrect answers can be automatically counted. Still, the interplay between student and teaching machine is only in rudimentary form.

It is an object to improve the capability of interchange of information between student and a teaching machine and to enable the student to introduce replies into the machine in a form which is more sophisticated and complete than in prior art equipment, without substantially complicating the machine structure.

SUBJECT MATTER OF THE PRESENT INVENTION

Briefly, a movable record means such as a magnetic tape stores instructional items thereon for presentation to a student. The tape is read by a transducer, amplified, and presented to the student over a loudspeaker, earphones, or the like. The student has a signal input device such as a keyboard, telephone dial or the like. Upon selection of a particular key, or a combination of keys (or dialing of the dial) a given code is generated. The instructional item recorded on the tape, at the end of the item, is so arranged that the student is asked to reply to a question posed and to operate the keyboard, or dial, to select an indication of the answer.

Besides the instructional item, the tape has recorded thereon a code representative of the correct answer to be given; and further, an "end of item" signal, such as a supersonic or sub-audible frequency. As soon as the "end of item" signal is detected, the earphones or loudspeaker are disabled and the tape recorder reading head is switched over to a code storage device which stores the code recorded on the tape indicative of the correct answer. When the student operates his input device, the code generated by the particular key, or dial movement, or combination of keys and dial movements, is compared with the code derived from the tape. Upon coincidence, indicative of a correct answer, the tape is caused to move forward to the next instruction item, the correct answer can be counted, and an indication is given to the student. Upon non-coincidence, indicative of a wrong answer, an indication is given to the student. When a predetermined count of wrong answers is reached, the tape is then caused to proceed either to the next instruction item, or to an auxiliary instruction item which further explains the prior item, in order to give additional instruction to then elicit the correct answer.

The principal components of the teaching machine thus are: (a) a record reproduction system (such as a sound reproducer) to reproduce the questions previously recorded, sense control items recorded and transduce coded signals indicative of answers; (b) a keyboard or similar device to act as a read-in unit, or interface between student and machine; (c) a memory or storage device to record, after decoding, on the one hand the coded signals from the recording medium, such as the magnetic tape, and recording the correct answers, and additionally to record the coded signals derived from the keyboard; and (d) a logic, or comparator circuit which compares the two recorded codes.

Figure 4:
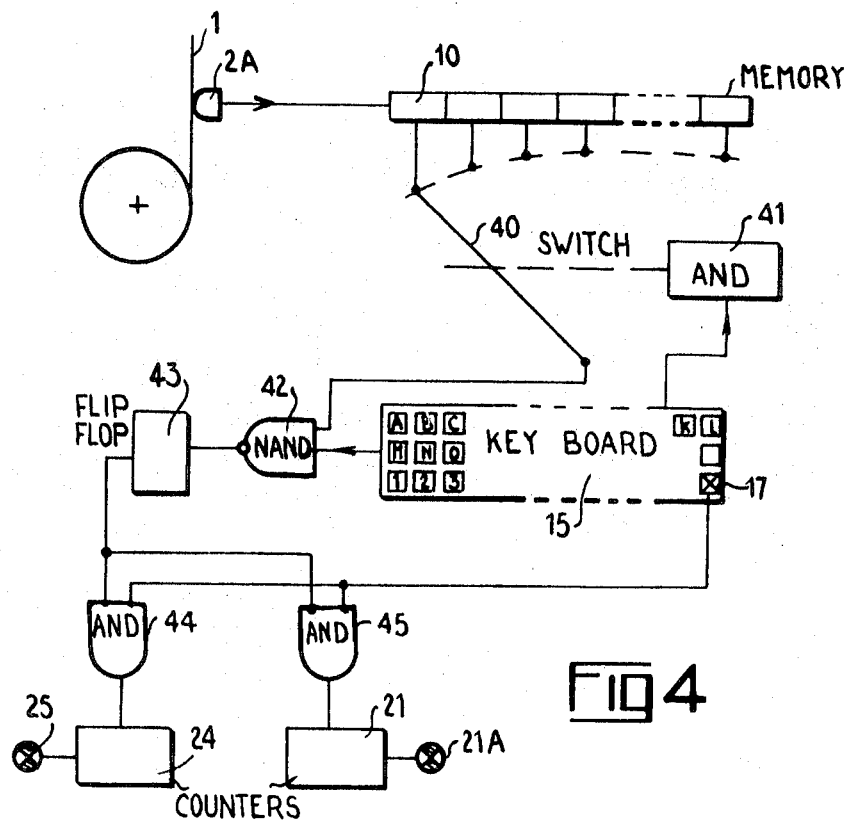
Figure 6:
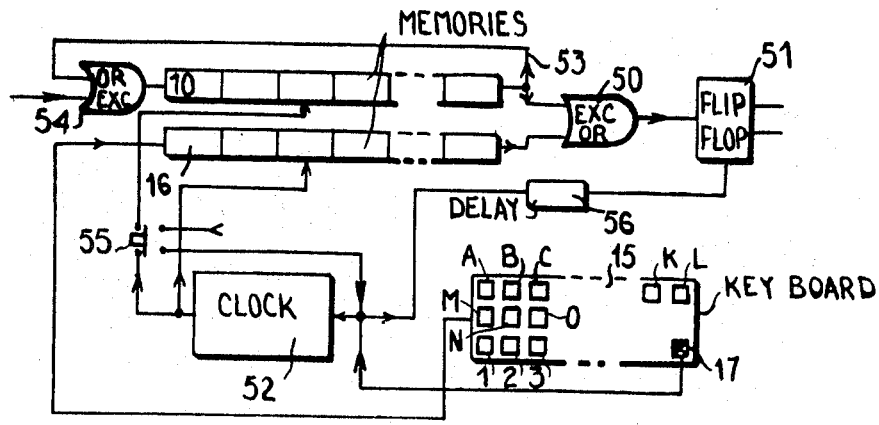
Figure 8:
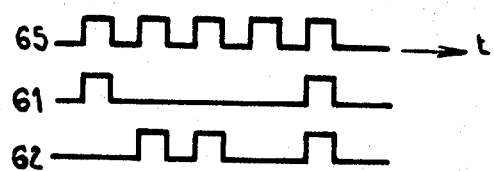

The invention will be described by way of example with reference to the accompanying drawings, wherein:

FIG. 1 is a schematic diagram of the teaching machine;

FIGS. 2, 3, 5, and 7 are partial schematic diagrams of portions of the teaching machine of FIG. 1, illustrating possible alternative constructions;

FIGS. 4 and 6 are general, simplified schematic diagrams of two other embodiments of the present invention; and FIG. 8 is a schematic graph of signals appearing in the system.

In all figures, like parts have been given the same reference numerals. The machine as shown in FIG. 1 is based on sound records recorded on a magnetic tape 1. A transducer head 2 picks up signals which are connected to an amplifier 3. The signals from amplifier 3 are connected to normally closed (NC) contacts 4 of a relay 5 through a volume control schematically shown at 6 to a loudspeaker, or earphone 7. Each pupil will have an individual set of earphones.

Magnetic tape 1 has recorded thereon instruction items which terminate in a question which is put to the student. At the end of each instruction item, a sub-audible frequency, for example in the 70 Hz range, is recorded on the tape. A special, low-frequency sensitive amplifier 8 is connected to the output of amplifier 3 and provides an output signal which is applied to relay 5, opening the NC contacts 4 and closing normally open (NO) contact 9. The audio transducer 7 is thus removed from the circuit and, instead, signals derived from tape 1 are now applied over amplifier 3 to a memory or storage element 10 which, as shown, is formed by a shift register having serial input and parallel output.

The "end of item" sub-audible frequency signal recorded on tape 1 is followed by signals representative of a correct answer, encoded in binary code, and indicating a sequence, or set of alpha-numerical characters to form the correct answer to the question posed by the preceding instruction item. The coding of the signals may be as desired; one simple code is the ordinary "Telex" code, formed as an amplitude, frequency, or phase modulated carrier signal of acoustic frequency. Each bit of the coded signal is recorded in a specific unit of the memory 10.

The "end of item" signal is superimposed on the coded signal, to maintain relay 5 in pulled-in position until all bits of the code recorded on tape 1 are stored in memory 10. As soon as the sub-audible signal ceases, relay 5 will drop out. A source of positive voltage is connected to contacts 11 and then to a network consisting of resistances 13, 14, and a condenser 12. The network, and the type of contact 11 are so arranged that, upon closing (or opening) of relay 11, an electric pulse A is obtained across resistance 13, due to charge (or discharge) of condenser 12. Pulse A controls operation of the motors which wind the tape 1. Neither the motors, nor the control by the pulse from condenser 12 are shown in detail, since both are well known in the art. Suitable diodes may be inserted in the control circuit to prevent pulses of undesired polarity from affecting operation of the control arrangement.

When the student has listened to the instructional item and to the question at the end thereof, he is invited to record his answer by successive, or simultaneous operation of keys on a keyboard 15. Operation of any one key produces a pulse train which, in binary code, is representative of an alphanumeric character. This pulse train is applied to a memory 16, identical to memory 10. When the student has entered his reply, he then operates a special button 17 indicating that the response is complete.

Figure 7:
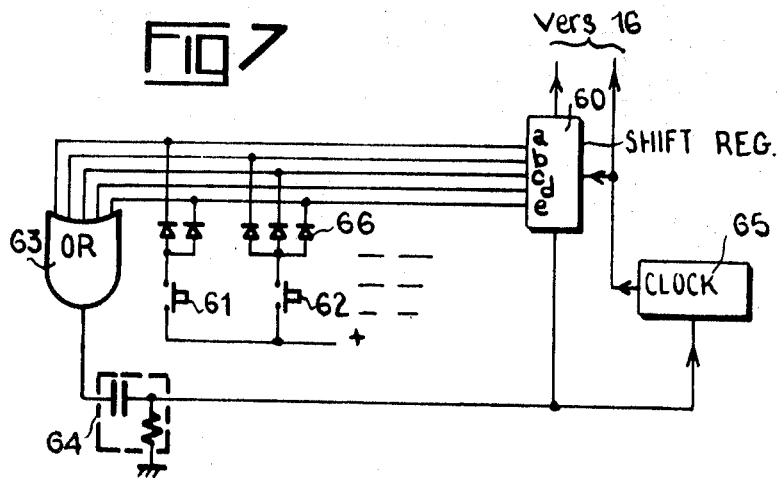

FIG. 7 illustrates in greater detail a form of keyboard and the connections thereto. Input to shift register 60, which is connected to shift register 16 in FIG. 1, is in parallel; output is series. A set of inputs, $a, b, c, d$, accept signals in a code of five digits. Operation of any one key 61, 62 of the keyboard applies a tension to preselected lines of the set of parallel input lines. Diodes 66 are provided to avoid spurious, parallel paths and interconnection of the input lines among each other. Thus, operation of key 61 applies tension only to lines $a$ and $e$; operation of key 62 applies tension only to lines $b, c$, and $e$. Thus, each key may correspond to a specific group of lines having a voltage applied thereto, and another group of lines having zero voltage. Alphanumeric characters may, thus, be transduced into binary language, each key having a specific code assigned to it. Operation of any key will provide sequences of pulses at the output of OR circuit 63. A differentiating circuit 64, connected to the output of circuit 63 then provides two outputs of opposite polarity, corresponding to the forward and rear flanks of pulses derived from OR-gate 63. The first of these differentiated waves is utilized to control the recording of the pulses in register 60; the second one is utilized to start a clock 65. Clock 65 supplies a pulse each for each input to register 60, for example five in the example chosen in FIG. 7. These pulses are applied to the shift control input of shift register 60.

The output of shift register 60 will thus be a train of pulses which has the characteristic given by the particular key which has been operated. FIG. 8 illustrates pulse trains $61a, 62a, 65a$ and available at the outputs of clock 65, and at the output of shift register 60, respectively, upon operation of the respective keys 61, 62.

The sequential pulses derived from shift register 60 are applied to memory 16, under control of the clock pulses from unit 65, to be recorded in the various positions of shift register 16.

Similar units of shift registers 10 and 16 are connected to the two inputs of AND-gate 18. Each output of AND-gate 18 is connected, in turn, to a multiple-input AND-gate 19. The output from AND-gate 19 thus will be indicative of complete coincidence of all the stages of the shift registers 10, 16; if output from AND-gate 19 is obtained, that is, for example, if the AND-gate output 19 would be high, indicating that all its inputs are activated, the high output will indicate that the response by the student is identical the code recorded on tape 1. Upon simultaneous appearance of a high output from AND-gate 19 and operation of key 17, AND-gate 20 will be activated and have an output which will activate a "correct reply" counter 21, to count the correct answers, and also to indicate that a correct answer was given on a "correct answer" indicator 21A. The indicator 21A may remain lit for a predetermined time, for example several seconds, by a delay circuit inherent therein and not specially shown. Simultaneously, a signal will be applied to OR-gate 23, which will have an output signal M. Output signal M controls restarting of the motor of the tape 1 to present a subsequent item to transducer head 2, and to re-set shift register 10 to zero. The shift register 16 is re-set to zero upon operation of key 17 through a circuit from key 17, OR-gate 28 to the shift register 16.

If the student supplies an answer which is different from that which is recorded on tape 1, and decoded and fed into shift register 10, no output will be obtained from AND-gate 19. Operation of key 17 will, however, cause output from AND-gate 22 which, as schematically indicated, has an inverted input from AND-gate 19. A counter of mistaken replies (CMR) 24 will step by one count, and simultaneously a "mistaken reply" indicator 25 will be energized. The indicator 25 preferably contains a legend inviting the student to think again and to give a different reply. A counter 26, likewise activated from AND-gate 22 is caused to progress one step. If the student, after reconsideration, proposes a second incorrect answer, the same step will be repeated, counter 26 stepping a further count. When counter 26 has reached a predetermined count, for example three, it will provide an output pulse which is connected to OR-gate 23, again causing the previously described operations — start of the motor to cause tape 1 to proceed to the next item, and re-set of memory 10. Additionally, a pulse from OR-gate 23 is transmitted back to counter 26 to re-set the counter to zero. Thus, the system is not indefinitely blocked if the student does not, eventually, find the correct answer. Preferably, the next instruction item contains the correct answer to the previous item, before proceeding with further educational material. This is provided to the student over transducer element 7. Button 27, and OR-gate 28 enable the student to erase, manually, memory 16 in case the student had made a mere recording error on keyboard 15, which is discovered before operation of key 17.

Figure 5:
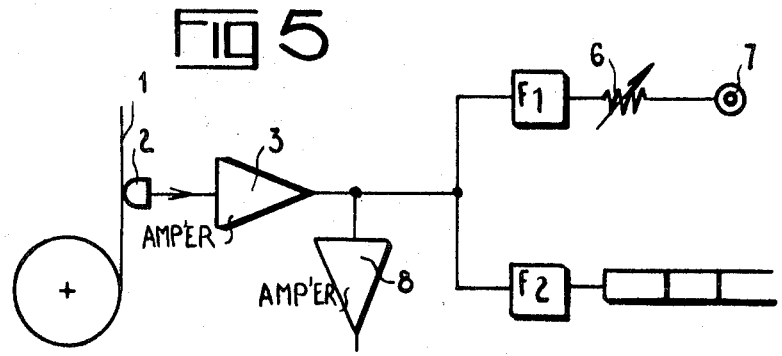

In accordance with a feature of the invention, the text of the instruction item and the coded signal which identifies the correct reply is superimposed on the same track of the magnetic tape. Each coded signal is formed as an amplitude, phase, or frequency modulated signal on a carrier having a carrier frequency beyond the frequency spectrum allocated to the instructional item. For example, without detracting from the intelligibility of the text, the frequency band of the voice recording of the instructional item can be limited to about 3,000 Hz; the coding signals can then be recorded on a carrier having a frequency jump from 4,000 to 5,000 Hz. Thus, it is simple to isolate a code of a lowest frequency of 4,000 Hz from speech frequency of 3,000 Hz and below by means of a frequency filter which attenuates substantially all frequencies below 4,000 Hz. The coded signal will not, moreover, be disturbed by the recording of the text if precautions are taken to cut off all frequencies above 3,000 Hz. Well known techniques in the communication field, in particular relating to carrier current systems may be used. FIG. 5 is a partial schematic diagram which illustrates the connection of amplifier 3, permanently connected to a low-pass filter F1 to supply the acoustic transducer; and further, permanently connected to a high-pass filter F2 permanently connected to the storage element, shift register 10. The "end of item" signal may be very short to take up but little time in the running of the tape to provide for efficient utilization thereof.

The individual circuit components themselves are well known in the art and need not be described in detail; relays, logic circuits, and the like may be constructed in any convenient manner.

Figure 2:
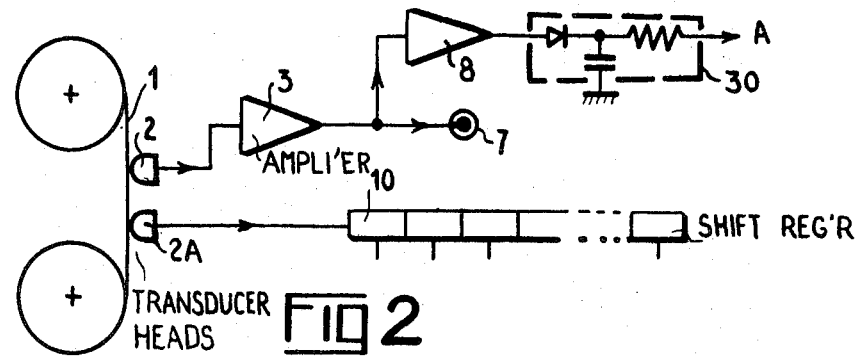

Various modifications and changes may be made in the teaching machine as basically described above. FIG. 2 illustrates a variation in which the machine is supplied with two transducer heads 2, 2A, each aligned with a separate track on magnetic tape 1. One track is assigned to the instructional item, the other to the coded signals identifying the correct answer. An arrangement in accordance with FIG. 2 has the advantage that the time to record the correct answer in memory 10 is extended. Thus, this additional time may be utilized to add redundancy bits to a code to reduce, or suppress reading errors which may arise during recording or reproduction. By extending the capacity of memories 10 and 16, longer answers may be recorded. The comparison and other circuits, not shown in FIG. 2, are similar to those illustrated in connection with FIG. 1.

In the embodiment of FIG. 2, the two transducer heads 2 and 2A, shown adjacent each other, would, in actual construction, actually be one on top of the other and arranged to read parallel tracks. The text is read by transducer head 2, connected to the input of amplifier 3, and connected to acoustic transducer 7. The "end of item" signal is detected by the selective amplifier 8, then rectified and filtered in rectifier-filter unit 30 and then connected to an output A to control the running motor to the tape 1 to stop. The codes which are representative of the correct reply are read by transducer 2A and connected to memory 10.

In accordance with another embodiment, an output printer is associated with the teaching machine. An output printer may be utilized in connection with the embodiment of FIG. 1, as well as with that of FIG. 2. The printer will print out the reply, or the successive replies of the student. These answers may be printed in black. The correct answer, as read from the tape, may be printed in red. The machine may, for example, print out the correct answer after the student has delivered the last reply which the machine will accept, for example the correct answer, or the third erroneous reply, the number of replies being determined by the setting of counter 26. The student thus obtains a written record which permits comparison of his answers to those deemed correct by the teaching machine. The motor driving the tape is started only when the contents of memory 10 are transferred to the printer.

Figure 3:
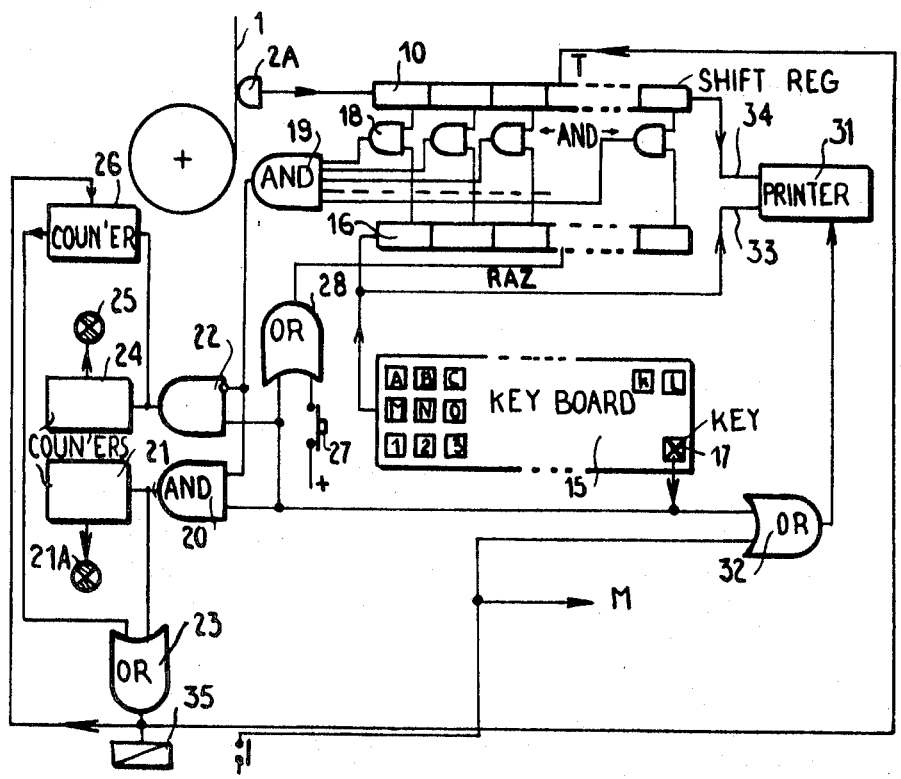

Another embodiment is illustrated in FIG. 3, which is a variation of the embodiment described in connection with FIG. 2, that is a separate track is utilized for the coded signals.

Keyboard 15 is connected to one of inputs 33 of a printer 31 in such a manner that as the student proceeds to type on the keys of keyboard 15, memory 16 is filled as the answer is recorded on printer 31. Operation of key 17 again, as before, starts comparison in AND-gate 20 and AND-gate 22, respectively. Additionally, OR-gate 32 is activated to operate the carriage return and line spacer of printer 31. The signal from circuit 32 does not, as in FIG. 1, control erasing of memory 10, but rather transfers the content to the printer 31 through output 34. Outputs 33, 34 are equivalent; the output applied over line 34, however, is printed in a different style, or color from that from output 33. Thus, the distinction between the answer from the student and that supplied by the code will become plain. A slow response relay 35 controls operation of the spooling motor for the magnetic tape, as indicated by the line for signal M; additionally, OR-gate 32 has the input from the contacts of relay 35 applied thereto to control carriage return and line spacing of printer 31. The delay in response of relay 35 is controlled such that sufficient time is available for the memory 10 to be completely emptied and supplied to printer 31 before relay 35 will respond.

Another embodiment of the invention is illustrated in FIG. 4; the reply supplied by the student is not recorded in a memory but rather compared step by step as it is given with the contents of memory 10. A commutator, or stepping switch 40, or any similar arrangement, such as a logic circuit, having a similar function, successively tests the contents of the various stages of memory 10. A unit 41, schematically indicated, steps the switch 40 in response to each pulse emitted from keyboard 15, upon operation of any one key. The AND-circuit 41, having an inverted output, compares at all instances the contents of a stage of memory 10 with the pulses from the keyboard 15. As soon as a mismatch is detected, a voltage will appear at the output of unit 42, causing change of state of flip-flop 43. When the student operates key 17, AND-gate 44 will have an output thereat to operate the counter of mistaken replies 24. If, on the other hand, there is no mismatch, AND-gate 45 (which has an inverted input) provides an output voltage which operates counter 21 of the correct replies, and the associated correct reply indicator 21A.

Embodiment of FIG. 6: Memory 10, and memory 16 are shift registers having series inputs and series outputs. These memories are filled at the left side, as previously described in connection with FIG. 1, memory 10 receiving the codes recorded on the magnetic tape, and memory 16 the signals from keyboard 15.

The outputs of the two memories are connected to the inputs of an "exclusive-OR" circuit 50 which controls a bi-stable flip-flop 51. Operation of key 17 of the keyboard 15 starts a clock 52 which provides as many pulses as the shift registers 10 and 16, respectively, have stages. These pulses cause successive shifting of the data recorded in the stages of the shift register towards the right. Circuit 50 compares, at all instances, the outputs derived from the registers. If the contents of the registers are not identical, that is if the response from the student differs from that recorded on the magnetic tape, circuit 50 will detect the mismatch and cause change-over of flip-flop 51 to its second stable state. The final state of flip-flop 51 will thus be different, depending upon whether the student has supplied a correct, or a mistaken reply. The information stored in flip-flop 51 is used, as before, in order to control the counters of correct, and mistaken replies, and to control the indicators connected thereto.

Register 10 is connected through a line 53 to an OR-gate 54 so that, at the end of the pulses from clock 52, memory 10 will again be in the same state as when previously loaded. Thus, if the student had supplied an erroneous answer he may, thereafter, supply another one which can again be compared with the contents of memory 10 under the same conditions as before.

The spooling motor, or motors of the magnetic tape causes re-set of clock 52 to start another cycle, and further causes interruption of the connection of line 53. Line 53 can be opened, for example, by an additional contact on the relay controlling motor operation, and now shown for simplicity of the drawing. In this manner, as clock 52 again supplies shift pulses, the shift register 10 will empty due to interruption of the re-circulating line 53 to become cleared to record the code indicative of the correct answer at the end of the subsequent item.

If the student should notice that, before operating key 17, he had erroneously operated the wrong key, memory 16 can be erased by applying the pulses of clock 52 only to shift register 16. Operating key 55 starts clock 52 while, at the same time, cutting the connection between clock 52 and memory 10 by opening of a normally closed contact. Flip-flop 51 is reset to its rest, or zero position after each operation of key 17, or of key 55, so that it shall always be in the rest (or zero) position before the contents of memories 10 and 16 are to be compared. A delay element, schematically indicated by unit 56, retards re-set to zero during the time required for comparison.

In accordance with another feature of the invention, operation of one key of keyboard 15 may control codes assigned to several alphanumeric characters such as letters, numbers, or other signs, in accordance with the principle well known from the ordinary telephone dial. The code sent by such an input device will have some ambiguity in the answer; nevertheless, the probability that a wrong reply will correspond exactly to the code for the correct answer is, as has been found from practical experience, very small; this probability decreases as the number of letters required for the correct answer is increased. Such a system has the advantage of requiring only a simplified keyboard, a lesser length of code assigned to each key, and a simplified comparison device to compare the replies furnished by the student and the replies recorded on the tape. Such a system cannot, however, be readily used with a print-out device printing answer in clear, human recognizable language.

The present invention may be combined with the features described in prior application U.S. Ser. No. 832,290, assigned to the assignee of the present invention, entitled "Teaching Machine." In accordance therewith, if the answer supplied by the student is not correct, a sub-item, rather than a subsequent instruction item is displayed to the student. Such sub-items may be recorded on auxiliary tracks, or in interlaced positions on a single track, and are designed to guide the student to the correct reply. The memory elements for the recorded reply, the memory elements for the response by the student, and the comparison devices between the two replies may be constructed as described in the above-mentioned patent application.

The present invention has been described in connection with presentation of instructional items by way of magnetic tape having recorded thereon acoustic signals, to audibly present these items to the students. The recording medium may take other forms; and the presentation of the instructional item to the student need not be aurally, but may take different forms, and various modifications and changes may be made within the scope of the inventive concept.

I claim:

1. Teaching machine comprising a movable recording means to store instructional items thereon for presentation to a student, said movable recording means having a magnetic track to record, in form of magnetic digital pulses in a predetermined sequence, a code indicative of a correct answer to represent binary numbers in the predetermined sequence;

transducer means associated with said recording means and having an output device providing a human recognizable output from said storage means, and further providing an output electrical signal representative of the code of the correct answer;

a student operated keyboard, recording student-generated answers entered thereon;

indicator circuits indicating correct and incorrect answers entered in said keyboard;

a first storage circuit storing the code indicative of the correct answer provided by said recording means;

means responsive to operation of a plurality of keys of said keyboard in the sequence of their operation and providing coded signals arranged in a binary digital code, in which a unique number is assigned to each key, said code being similar to said recorded code, the operation of a selected number of predetermined keys in a specific sequence providing a response code comprising unique binary numbers in said sequence;

and comparator means comparing the code stored in said first storage means and the answer code provided by said keyboard, the output of said comparator means being connected to said indicator circuit to indicate match and mismatch of said codes and thus correct and incorrect answers detected by coincidence, or non-coincidence of the keyboard generated answer code and the recorded code, in said sequences, in said comparator means.

2. Teaching machine according to claim 1, including a second storage circuit storing the answer code derived from said keyboard, the outputs of both said storage circuits being applied to said comparator means.

3. Teaching machine according to claim 2, wherein said keyboard contains alphanumeric representations and an additional special key (17), said special key controlling advance of said recording means, and clearance of said storage circuits (10, 16);

said machine including a counter means counting correct and incorrect answers, said special key further re-setting at least one of said counter means to zero.

4. Teaching machine according to claim 3, wherein each key, except the special key, is associated with a plurality of separate alpha-numerical representations.

5. Teaching machine according to claim 1, wherein said instruction items are stored in the form of recorded sound signals on the sound track of the movable recording means, and covering a first frequency band;

and control signals having a frequency outside said frequency band are recorded on said recording means.

6. Teaching machine according to claim 1, wherein said instruction items are stored in the form of recorded sound signals on said recording means on one track thereof;

and control signals are recorded on said recording means on another parallel track.

7. Teaching machine according to claim 1, including human readable read-out means connected to said keyboard and having the coded signals applied thereto to provide a human readable output of the student's answer.

8. Teaching machine according to claim 7, including a further input connected to said read-out means to apply the code delivered from said record means thereto to provide, additionally, a human readable output of the correct answer to enable checking of the correct answer against the student's answer.

9. Teaching machine according to claim 1, including a counter means (26) connected to count correct and mistaken replies, and connected to the output of said comparator means, said counter, upon counting a correct answer, or upon a predetermined number of incorrect answers having been counted, controlling further movement of said movable recording means to present a further instruction item to the student.

10. Teaching machine according to claim 9, wherein said recording means has primary instruction items and secondary instruction items recorded thereon;

and said counter means, upon counting to a predetermined count of mistaken answers, control said transducer means and said movable recording means to provide a human recognizable output from a secondary instruction item.

11. Teaching machine according to claim 1, wherein said transducer means includes a signal-responsive means;

said recording means has a signal having a predetermined characteristic recorded thereon indicative that the end of an instructional item has been reached, said signal-responsive means responding to said predetermined characteristic;

and a switch-over means is provided responsive to said signal-responsive means, connected to interrupt interconnection of said transducer means to the output device and connect said transducer means to said first storage means.

12. Teaching machine according to claim 11, wherein said switch-over means is further connected to stop continued movement of said movable recording means.

* * * * *